United States Patent
Güll et al.

(10) Patent No.: US 8,433,549 B2
(45) Date of Patent: Apr. 30, 2013

(54) ALGORITHM FOR THE EFFICIENT CALCULATION OF MULTIPLE FIBER GROUP MATERIALS WITHIN A SPECIFIED FEM

(75) Inventors: Thomas Güll, Mensfelden (DE); Stephan Fell, Florsheim (DE); Valentin Schultheis, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 887 days.

(21) Appl. No.: 12/502,951

(22) Filed: Jul. 14, 2009

(65) Prior Publication Data
US 2011/0015905 A1  Jan. 20, 2011

(51) Int. Cl.
G06G 7/48 (2006.01)

(52) U.S. Cl.
USPC .............................................................. 703/6

(58) Field of Classification Search ................... 703/2, 6
See application file for complete search history.

(56) References Cited

U.S. PATENT DOCUMENTS

| | | | |
|---|---|---|---|
| 5,419,200 A | 5/1995 | Burns | |
| 7,010,472 B1 * | 3/2006 | Vasey-Glandon et al. | ........ 703/6 |
| 2009/0012749 A1 | 1/2009 | Ornjanovic | |

OTHER PUBLICATIONS

Parnas et al., "Design of fiber-reinforced composite pressure vessels under various loading conditions", Composite Structures, vol. 58, Issue 1, Oct. 2002, pp. 83-95.*
Chapelle et al., "Optimal design of a Type 3 hydrogen vessel: Part I—Analytic modelling of the cylindrical section", International Journal of Hydrogen Energy, vol. 31, Issue 5, Apr. 2006, pp. 627-638.*
Onder, "First Failure Pressure of Composite Pressure Vessels", Thesis, Graduate School of Natural and Applied Sciences of Dokuz Eylul University, Feb. 2007, 129 pages.*
Zhang, Y.X. "Recent Developments in Finite Element Analysis for Laminated Composite Plates" Composite Structures 88 (2009) pp. 147-157.
Klinkel S. "A Continuum Based 3D-Shell Element for Laminated Structures" Computers and Structures, 71 Mar. 1999, pp. 43-62.

* cited by examiner

*Primary Examiner* — Thai Phan
*Assistant Examiner* — Herng-Der Day
(74) *Attorney, Agent, or Firm* — John A. Miller; Miller IP Group, PLC

(57) ABSTRACT

A method for calculating multi-directional composites in FEM simulations for designing a high pressure tank. The method starts by reading data for the simulation including fiber orientation and composite material properties. Then, for every FEM element, the method calculates the stiffness of directional plies and converts the calculated stiffness into a local coordinate system for each ply. The method then calculates the stiffness of packets of fiber orientations as a layer set-up. The method then calculates engineering constants for the layer set-up and the equivalents for the stress limit for the layer set-up. The method then uses the engineering constants to calculate the stresses on the FEM elements and determines whether the calculated stress is above a predetermined stress limit for each element. If the calculated stress is above the stress limit, then the algorithm switches to a complex calculation of stress that calculates the stress for each ply.

16 Claims, 2 Drawing Sheets

ALGORITHM FOR THE EFFICIENT CALCULATION OF MULTIPLE FIBER GROUP MATERIALS WITHIN A SPECIFIED FEM

BACKGROUND OF THE INVENTION

1. Field of the Invention

This invention relates generally to a method for calculating multi-directional composites in finite element method (FEM) simulations and, more particularly, to a method for calculating multi-directional composites in FEM simulations that includes converting complex fiber structures being simulated into simplified single layer elements and determining the stress on the elements so as to reduce the calculations required to simulate the stress on each individual fiber in the structures.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

Typically, hydrogen is stored in compressed gas tanks under high pressure on the vehicle to provide the hydrogen necessary for the fuel cell system. The pressure in the compressed tank can be upwards of 700 bar. In one known design, the compressed tank includes an inner plastic liner that provides a gas tight seal for the hydrogen, and an outer carbon fiber composite layer that provides the structural integrity of the tank. Because hydrogen is a very light and diffusive gas, the inner liner and the tank connector components, such as O-rings, must be carefully engineered in order to prevent leaks. The hydrogen is removed from the tank through a pipe. At least one pressure regulator is typically provided that reduces the pressure of the hydrogen within the tank to a pressure suitable for the fuel cell system.

The material used for the outer layer of high pressure tanks and vessels of the type used for hydrogen storage tanks is typically a composite including a combination of a fiber and matrix materials where the fibers are oriented in various directions. One fiber orientation is referred to as a ply or a layer. The stacking of different fiber orientations is referred to a layer set-up. The fibers are wound on a mandrel using a predetermined fiber winding process to form the outer layer of the vessel.

When designing a vessel of this type, a finite element method (FEM) algorithm is typically employed that simulates how the composite fibers can be wound with the different fiber orientations to satisfy the desired structural integrity of the tank. FEMs are well known structural design and analysis methods that can simulate the stresses that may occur on the tank. The algorithms use various inputs, including the composite material properties, fiber orientations, location of the vessel in the vehicle, etc. For a hydrogen storage tank for a fuel cell vehicle, it is necessary to determine the stress locations on the tank that may occur as a result of a vehicle crash. In this regard, the location of the tank is important because of the structural vehicle elements that are around the tank that may puncture the tank in a crash event. Thus, the algorithm considers stresses on the tank during the simulation to determine whether the vessel will withstand the stresses satisfactorily. However, because of the nature of the simulation and the calculations that go into determining the stresses on each fiber for the different situations, the amount of computing cost and computing time for such FEM simulations is significant.

SUMMARY OF THE INVENTION

In accordance with the teachings of the present invention, a method for calculating multi-directional composites in FEM simulations for designing a high pressure tank is disclosed. The method starts by reading data for the simulation including fiber orientation and composite material properties. Then, for every FEM element, the method calculates the stiffness of directional plies and converts the calculated stiffness into a local coordinate system for each ply. The method then calculates the stiffness of packets of fiber orientations as a layer set-up. The method then calculates engineering constants for the layer set-up and the equivalents for the stress limit for the layer set-up. The method then uses the engineering constants to calculate the stresses on the FEM elements and determines whether the calculated stress is above a predetermined stress limit for each element. If the calculated stress is above the stress limit, then the algorithm switches to a complex calculation of stress that calculates the stress for each ply. The method then assesses the stress limit for every ply for each element, and if a single ply is above the stress limit, takes appropriate steps, such as identifies a material properties failure.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for calculating multi-directional composites in FEM simulations is merely exemplary in nature, and is in no way intended to limit the invention or its applications or uses. For example, the present invention has particular application for simulating the design of high pressure tanks for storing hydrogen gas on fuel cell vehicle. However, as will be appreciated by those skilled in the art, the present invention will have application for simulating any vessel being made out of composite windings.

Figure 1:
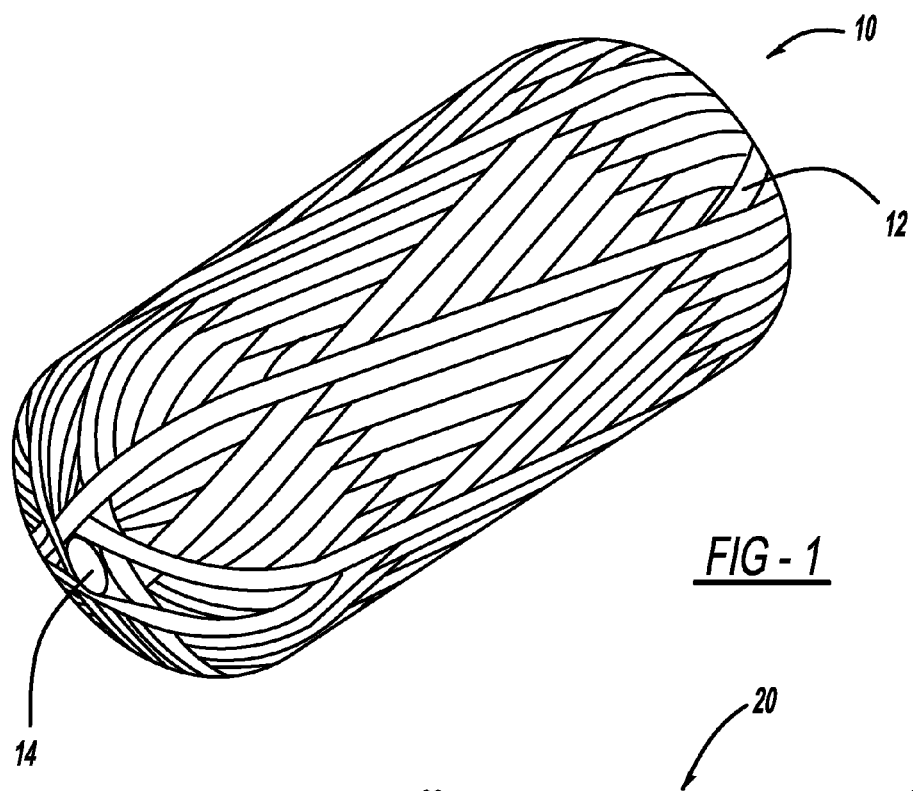
FIG. 1 is a perspective view of a high pressure tank including fibers wound on a mandrel.

FIG. 1 is a perspective view of a tank or vessel 10 including a plurality of composite plys or fibers 12 having various fiber orientations wound on a mandrel 14. The vessel 10 is intended to represent the various orientations that the fibers 12 can take that make up a high pressure vessel of this type and the complexity that goes into the winding process for winding the fibers 12 onto the mandrel 14. As will be discussed in detail below, the present invention proposes an FEM simulation algorithm and associated method for determining whether the stresses on the various fiber orientations meet the desired requirements in a simplified manner that reduces computing time and costs by employing engineering constants and classical laminate theory.

Figure 2:
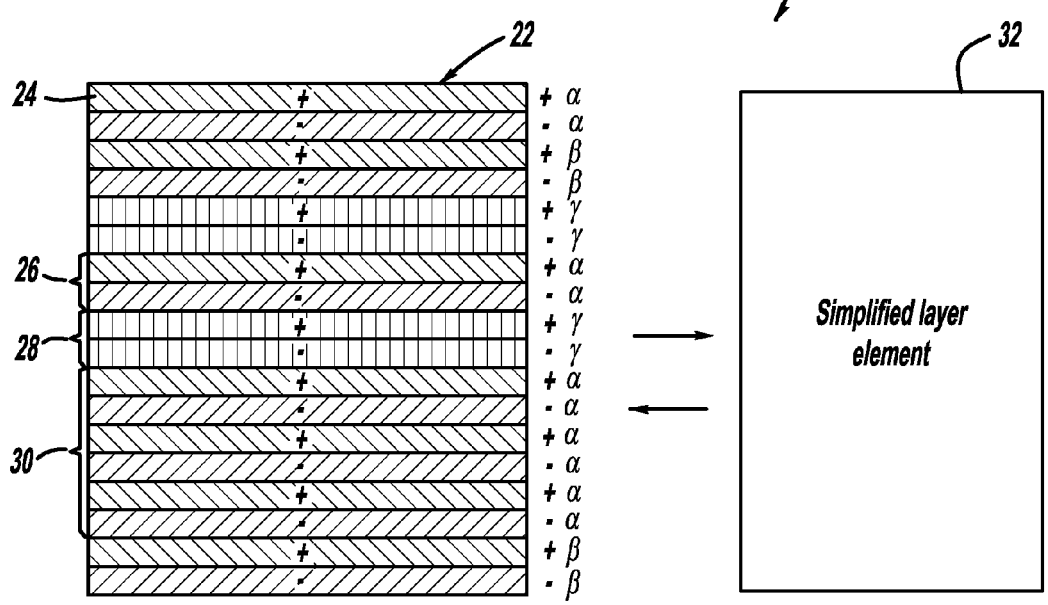
FIG. 2 is a depiction of a stack of fibers having different orientations and its conversion to a simplified single layer using classical laminate theory.

FIG. 2 is an illustration 20 showing a composite fiber layer structure 22 including a plurality of fiber layers 24 where each of the fiber layers 24 has a different fiber orientation and a different local stiffness. The structure 22 is intended to represent a layer set-up for a high pressure tank. The fiber layers 24 define various orientations and layers, including helical layers 26, hoop layers 28 and sequence layers 30. Engineering constants and classical laminate theory can be used to convert the complex fiber layer structure 22 into a simplified layer element 32 using known techniques where the several fiber orientations in the structure 22 are modeled as a single layer element.

As will be discussed below, the present invention converts a complex fiber structure being simulated for a proposed high pressure tank into a simplified single layer element, such as shown in FIG. 2, and then determines whether the single layer element meets the stress requirements for the particular tank. By reducing the complexity of the fiber structure to the single layer element, the computing time required for the simulation to determine if the tank will meet the stress requirements is reduced. If the single layer element does not meet the stress requirements, then a ply-wise stress analysis is performed on the original fiber structure to determine whether the simulation of the actual plys of the structure will meet the stress requirements.

Figure 3:
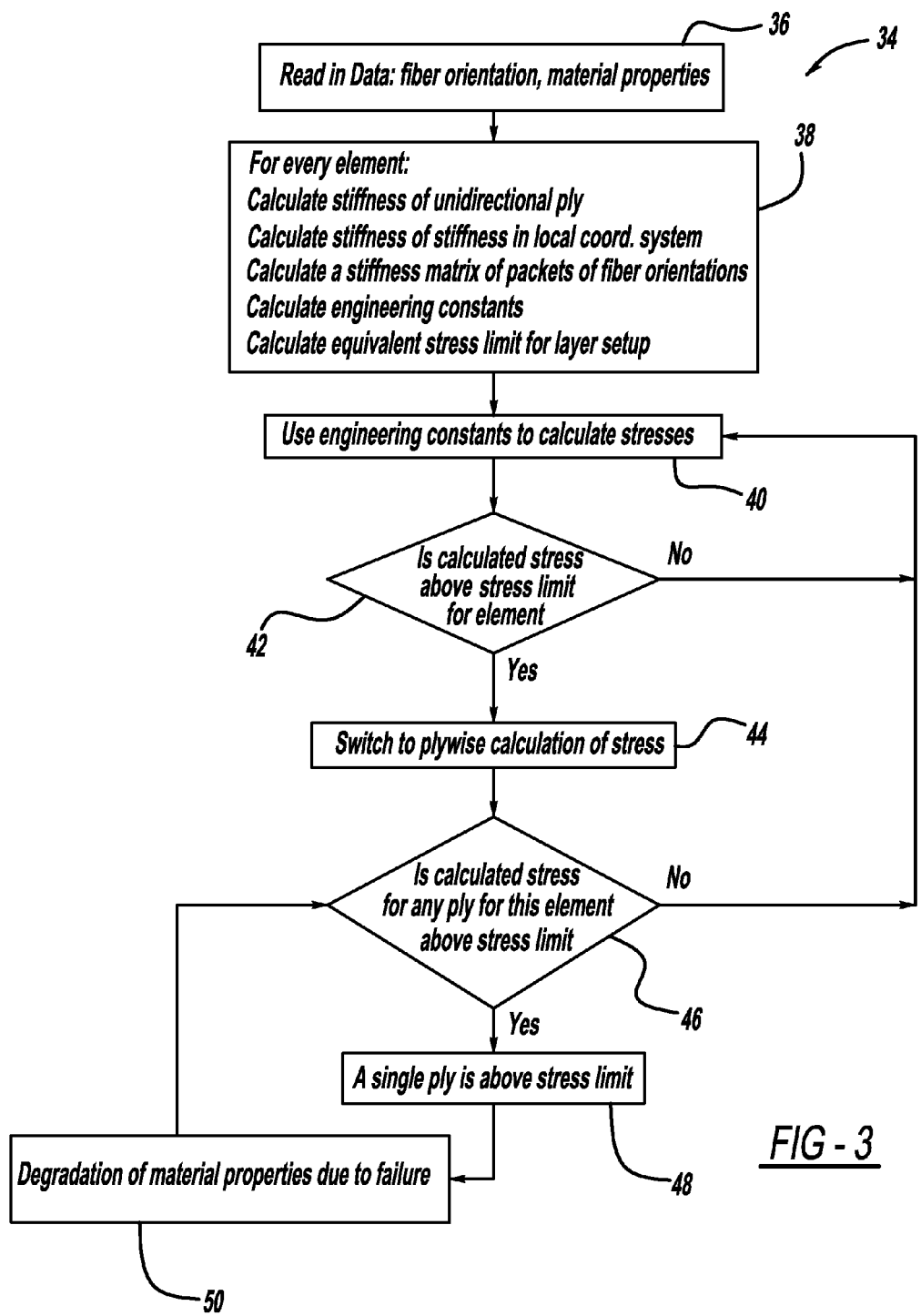
FIG. 3 is a flow chart diagram showing a process for an efficient calculation of multi-directional composites in an FEM simulation for designing a high pressure tank.

FIG. 3 is a flow chart diagram 34 showing a process for an efficient calculation of multi-directional composites in an FEM simulation for designing a high pressure tank. At box 36, the algorithm reads data including the fiber orientation and material properties of the composites used in the fibers for a particular vessel being simulated. The material properties include the material of the composite itself and its stiffness and strength. Other data can also be read in depending on the particular similar being performed, At box 38, a series of calculations are performed to convert a combination of fibers to a single layer element and calculate stresses for every element in the tank. In other words, the tank is comprised of a plurality of elements where each element includes a plurality of stacked fibers or plys. The stacked fibers can be converted to the single element, such as shown in FIG. 2, using classical laminate theory. A high pressure tank for a fuel cell system may include several hundred elements.

The algorithm calculates the stiffness of each unidirectional ply in the element using known calculation techniques that includes calculating the stiffness of the ply in three perpendicular directions. The algorithm also converts the calculations of stiffnesses for each ply to a local coordinate system. Once the algorithm has calculated the stiffnesses of all of the plys in the element, then the algorithm sums up the stiffnesses of the plys in each of the three directions as packets of fiber orientations. In other words, the algorithm provides a combined stiffness for all of the fibers in the element in each of the three directions. The algorithm then calculates engineering constants that represents the summed stiffness of the packets in the three directions for the various fiber orientations for the element. The engineering constants provide the stiffness of the packets of fibers without having to know the stiffness of the individual fibers themselves. Thus, the engineering constants give a smeared stiffness of the element over all of the plys. The algorithm also calculates an equivalent of the stress limit for the layer set-up for the element at the box 38, which gives the stress limit of the material of the element.

The algorithm then uses the engineering constants to calculate the stress on each element for the input parameters at box 40, and then determines whether the stress for the particular element being considered is above a predetermined limit threshold at decision diamond 42. If the stress for the element is not above the threshold at the decision diamond 42, then the algorithm returns to the box 40 to calculate the stress for the next element. If each element in the tank does not exceed the stress limit threshold for the particular fiber orientation for the material properties using the simplified layer, then the designer of the tank knows that further calculations and simulations are not necessary to determine whether the tank will meet the stress limit tests, and thus reduced computing time can be employed for the analysis. Complex calculations of the stresses on the fibers, including ply-wise calculation of the stresses, are only necessary if one or more of the elements is determined to have a stress greater than the stress limit threshold at the decision diamond 42.

If the stress for a particular element is above the threshold at the decision diamond 42, then the algorithm switches to a ply-wise calculation of stress on each ply or fiber at box 44. The ply-wise calculation of stress calculates the stress of each ply in the element and is the calculation that requires significant computing time that the present invention is attempting to avoid by first determining whether the element meets the stress limit test using the simplified layer, as discussed above. Various algorithms are known in the art for providing ply-wise calculations of stress.

At decision diamond 46, the algorithm determines whether the ply-wise calculation of stress for each ply has exceeded a predetermined threshold. If each ply in the element is below the stress limit threshold at the decision diamond 46, then the algorithm returns to the box 40 to calculate the stress for the next element because even though the simplified layer element of the previous element did not meet the stress limit test at the decision diamond 42, every ply in the element passed the stress limit test at the decision diamond 46 in the more detailed analysis, which means that the element does satisfy the simulations requirements. If, however, any one of the plys in the element exceeds the threshold at the decision diamond 46, as identified by a single ply being above the stress limit at box 48, then suitable action can be taken at box 50, such as stopping the simulation, providing analysis degradation of materials properties due to failure, etc.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A finite element method for simulating a structure employing multi-directional composite fibers, said method comprising:

providing input data concerning the composite fibers;

identifying a plurality of elements in the structure where each identified element of the plurality of elements includes a plurality of fibers having different orientations;

for each of the identified plurality of elements, calculating a stiffness of each fiber in each of the identified elements, using the calculated stiffness of each fiber to calculate a stiffness of packets of fiber orientations, using the stiffness of the packets of fiber orientations to calculate engineering constants of the element that identify the stress of each of the identified elements for the combined fibers in each of the identified elements and calculating equivalent stress limits for a layer set-up of each of the identified elements;

using the calculated engineering constants to calculate the stress on each of the identified elements;

determining whether the calculated stress on each element of the identified elements exceeds a first predetermined stress limit;

determining that the structure is satisfactory if the calculated stress on each element of the identified elements does not exceed the first predetermined stress limit;

performing a ply-wise calculation of stress for each fiber in a particular element of the plurality of identified elements if the calculated stress for the particular element exceeds the first predetermined stress limit; and determining that the particular element is satisfactory if the ply-wise calculation of stress for each fiber in the particular element does not exceed a second predetermined stress limit.

2. The method according to claim 1 further comprising determining a failure exists if the ply-wise calculated stress for one of the fibers of one of the identified elements does exceed the second predetermined stress limit.

3. The method according to claim 1 wherein providing input data concerning the composite fibers includes providing fiber orientation, fiber material and fiber strength and stiffness.

4. The method according to claim 1 wherein calculating a stiffness of each fiber in each of the identified elements includes calculating a stiffness of each fiber in each of the identified elements in three orthogonal directions.

5. The method according to claim 1 wherein the structure is a high pressure tank.

6. A finite element method for simulating a high pressure tank including multi-directional composite fibers, said method comprising:

providing input data concerning the composite fibers;

converting a plurality of the composite fibers into a single layer element for a plurality of single layer elements in the tank using classical laminate theory that includes calculating engineering constants that identify a stress of the element for the combined fibers in the element;

using the calculated engineering constants to calculate the stress on each of the plurality of single layer elements;

determining whether the calculated stress on each of the plurality of single layer elements exceeds a first predetermined stress limit;

determining that the tank is satisfactory if the calculated stress on each of the plurality of single layer elements does not exceed the first predetermined stress limit;

performing a ply-wise calculation of stress for each fiber in a particular element of the plurality of single layer elements if the calculated stress for the particular element exceeds the first predetermined stress limit; and determining that the particular element is satisfactory if the ply-wise calculation of stress for each fiber in the particular element does not exceed a second predetermined stress limit.

7. The method according to claim 6 wherein converting a plurality of the composite fibers into a single layer element includes calculating a stiffness of each fiber in the element, using the calculated stiffness of each fiber to calculate a stiffness of packets of fiber orientations, using the stiffness of the packets of fiber orientations to calculate the engineering constants of the element and calculating equivalent stress limits for a layer set-up of the element.

8. The method according to claim 7 wherein calculating a stiffness of each fiber in the element includes calculating the stiffness of each fiber in the element in three orthogonal directions.

9. The method according to claim 6 further comprising determining a failure exists if the ply-wise calculated stress for a single fiber in an element does exceed the second predetermined stress limit.

10. The method according to claim 6 wherein providing input data concerning the composite fibers includes providing fiber orientation, fiber material and fiber strength and stiffness.

11. A system using a finite element method analysis simulation for simulating a structure including multi-directional composite fibers, said system comprising:

means for reading input data concerning the composite fibers;

means for converting a plurality of the composite fibers into a single layer element in the structure that includes a plurality of single layer elements using classical laminate theory that includes calculating engineering constants that identify a stress of each single layer element of the plurality of single layer elements for the combined fibers in each single layer element;

means for using the calculated engineering constants to calculate the stress on each single layer element of the plurality of single layer elements;

means for determining whether the calculated stress on each single layer element exceeds a first predetermined stress limit;

means for determining that the structure is satisfactory if the calculated stress on each single layer element does not exceed the first predetermined stress limit;

means for performing a ply-wise calculation of stress for each fiber in a particular element of the single layer elements if the calculated stress for the particular element exceeds the first predetermined stress limit; and means for determining that the particular element is satisfactory if the ply-wise calculation of stress for each fiber in the particular element does not exceed a second predetermined stress limit.

12. The system according to claim 11 wherein the means for converting a plurality of the composite fibers into a single layer element calculates a stiffness of each fiber in the element, uses the calculated stiffness of each fiber to calculate a stiffness of packets of fiber orientations, uses the stiffness of the packets of fiber orientations to calculate the engineering constants of the element and calculates equivalent stress limits for a layer set-up of the element.

13. The system according to claim 12 wherein the means for converting a plurality of the composite fibers into a single layer calculates the stiffness of each fiber in the element includes calculating a stiffness of each fiber in the element in three orthogonal directions.

14. The system according to claim 11 further comprising means for determining a failure exists if the ply-wise calculated stress for a single fiber in an element does exceed the second predetermined stress limit.

15. The system according to claim 11 wherein the means for providing input data concerning the composite fibers provides fiber orientation, fiber material and fiber strength and stiffness.

16. The system according to claim 11 wherein the structure is a high pressure tank.

* * * * *